(12) United States Patent
Lee et al.

(10) Patent No.: US 12,592,629 B2
(45) Date of Patent: Mar. 31, 2026

(54) POWER CONVERTER

(71) Applicant: NXP B.V., Eindhoven (NL)

(72) Inventors: Jin Hui Lee, Nam-yang-ju-si (KR);
Jonghak Moon, Youngin-Si (KR)

(73) Assignee: NXP B.V., Eindhoven (NL)

( * ) Notice: Subject to any disclaimer, the term of this
patent is extended or adjusted under 35
U.S.C. 154(b) by 324 days.

(21) Appl. No.: 18/184,122

(22) Filed: Mar. 15, 2023

(65) Prior Publication Data

US 2024/0313649 A1 Sep. 19, 2024

(51) Int. Cl.
H02M 1/00 (2007.01)
H02M 3/158 (2006.01)

(52) U.S. Cl.
CPC ......... H02M 1/009 (2021.05); H02M 3/1582
(2013.01); H02M 1/0009 (2021.05); **H02M
1/0032** (2021.05)

(58) Field of Classification Search
CPC ............. H02M 1/0009; H02M 1/0032; H02M
1/0035; H02M 1/009; H02M 3/158;
H02M 3/1582
See application file for complete search history.

(56) References Cited

U.S. PATENT DOCUMENTS

| | | | |
|---|---|---|---|
| 9,041,373 B2 | 5/2015 | Jiang et al. | |
| 2017/0012529 A1* | 1/2017 | Yamada | H02M 3/158 |
| 2017/0194854 A1 | 7/2017 | Cherkassky et al. | |
| 2023/0170805 A1* | 6/2023 | Wei | H02M 3/157 |
| | | | 323/271 |

OTHER PUBLICATIONS

Kim, J. et al. "A Single-Inductor Eight-Channel Output DC-DC Converter With Time-Limited Power Distribution Control and Single Shared Hysteresis Comparator," in IEEE Trans. Circuits Syst. I: Regular Papers, vol. 60, No. 12, pp. 3354-3367, Dec. 2013, doi: 10.1109/TCSI.2013.2265960. (Year: 2013).*

Xu, Weiwei et al.; "A Dual-Mode Single-Inductor Dual-Output Switching Converter With Small Ripple"; IEEE Transactions on Power Electronics, vol. 25, No. 3, Mar. 2010; pp. 614-623.

Analog Devices; "The SIMO DC-DC Converter is Your Audio Amplifier's Best Friend"; Downloaded from the internet Mar. 6, 2023 from https://www.analog.com/en/technical-articles/the-simo-dcdc-converter-is-your-audio-amplifiers-best-friend.html; 7 pages.

* cited by examiner

*Primary Examiner* — Fred E Finch, III

(57) ABSTRACT

One example discloses a power converter, including: a power supply input configured to receive electrical power; a controller; an inductance having a first end coupled to the power supply input; a first load channel coupled to a second end of the inductance, and having a first select switch (SEL1) coupled to the controller, and configured to present a first output voltage (Vout1) and a first charge current from the power supply input to a first load; a second load channel coupled to the second end of the inductance, and having a second select switch (SEL2) coupled to the controller, and configured to present a second output voltage (Vout2) and a second charge current from the power supply input to a second load.

20 Claims, 4 Drawing Sheets

POWER CONVERTER

The present specification relates to systems, methods, apparatuses, devices, articles of manufacture and instructions for power conversion.

SUMMARY

According to an example embodiment, a power converter, comprising: a power supply input configured to receive electrical power; a controller; an inductance having a first end coupled to the power supply input; a first load channel coupled to a second end of the inductance, and having a first select switch (SEL1) coupled to the controller, and configured to present a first output voltage (Vout1) and a first charge current from the power supply input to a first load; a second load channel coupled to the second end of the inductance, and having a second select switch (SEL2) coupled to the controller, and configured to present a second output voltage (Vout2) and a second charge current from the power supply input to a second load; wherein the controller is configured to set a first on-time (Ton1) for the first channel using the SEL1, and to set a second on-time (Ton2) for the second channel using the SEL2; wherein the controller is configured to calculate a first switching frequency for the first channel by counting a number of times the first output voltage (Vout1) switches between above and below a first reference voltage (Vref1); and wherein the controller is configured to adjust the first on-time (Ton1) based on the first switching frequency.

In another example embodiment, the controller is configured to adjust the first on-time (Ton1) so that the first switching frequency falls within a predefined frequency range.

In another example embodiment, the controller is configured to calculate a second switching frequency for the second channel by counting a number of times the second output voltage (Vout2) switches between above and below a second reference voltage (Vref1).

In another example embodiment, the controller is configured to adjust either the first on-time (Ton1) and/or the second on-time (Ton2) based on either the first switching frequency and/or the second switching frequency.

In another example embodiment, the controller is configured to adjust the first on-time (Ton1) so that the first switching frequency falls within a first predefined frequency range; and the controller is configured to adjust the second on-time (Ton2) so that the second switching frequency falls within a second predefined frequency range.

In another example embodiment, the first predefined frequency range and the second predefined frequency range are outside of at least one of: an audible frequency range, an interference frequency range, or a statutorily regulated frequency range.

In another example embodiment, the controller is configured to adjust the first on-time (Ton1) and the second on-time (Ton2) so that the first switching frequency and the second switching frequency falls within a same predefined frequency range.

In another example embodiment, the first switching frequency is generated by a voltage ripple on the first output voltage (Vout1); and the controller is configured to adjust the first on-time (Ton1) so that the voltage ripple falls below a predefined voltage ripple.

In another example embodiment, further comprising first and second comparators (Comp1, Comp2) coupled to respectively receive the first and second output voltages (Vout1 and Vout2) and the first and second reference voltages (Vref1, Vref2); wherein the first comparator (Comp1) is configured to output a first logic state if Vout1 is below Vref1 and a second logic state if Vout1 is above Vref1; and wherein the controller is configured to calculate the first switching frequency by counting a number of times the first comparator (Comp1) switches between the first logic state and the second logic state within a predetermined time period.

In another example embodiment, the first logic state is a first power request signal commanding the controller to provide more charge current to the first load channel; and the second logic state is a second power request signal commanding the controller to provide less charge current to the first load channel.

In another example embodiment, the inductance is a single inductor.

In another example embodiment, the first load channel is a heavy-load channel, and the second load channel is a light-load channel.

In another example embodiment, the power converter is a DC to DC converter.

In another example embodiment, the first on-time (Ton1) does not overlap with the second on-time (Ton2).

In another example embodiment, further comprising a valley current sensor coupled between the inductance and the controller, and configured to measure a total current (IL) in the inductance.

In another example embodiment, the controller is configured to stop sending charge current to the first load channel and start sending charge current to the second load channel when the total current (IL) through the inductance decreases to a predetermined valley current limit.

In another example embodiment, in response to a load transient, the controller is configured to change the predetermined valley current limit from a first limit to a second limit; and the controller is configured to begin counting the number of times the first output voltage (Vout1) switches between above and below a first reference voltage (Vref1) when the controller changes the first limit to the second limit, and ending after a predetermined time period.

In another example embodiment, the controller is configured to average the first switching frequency over the predetermined time period.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

Figure 1:
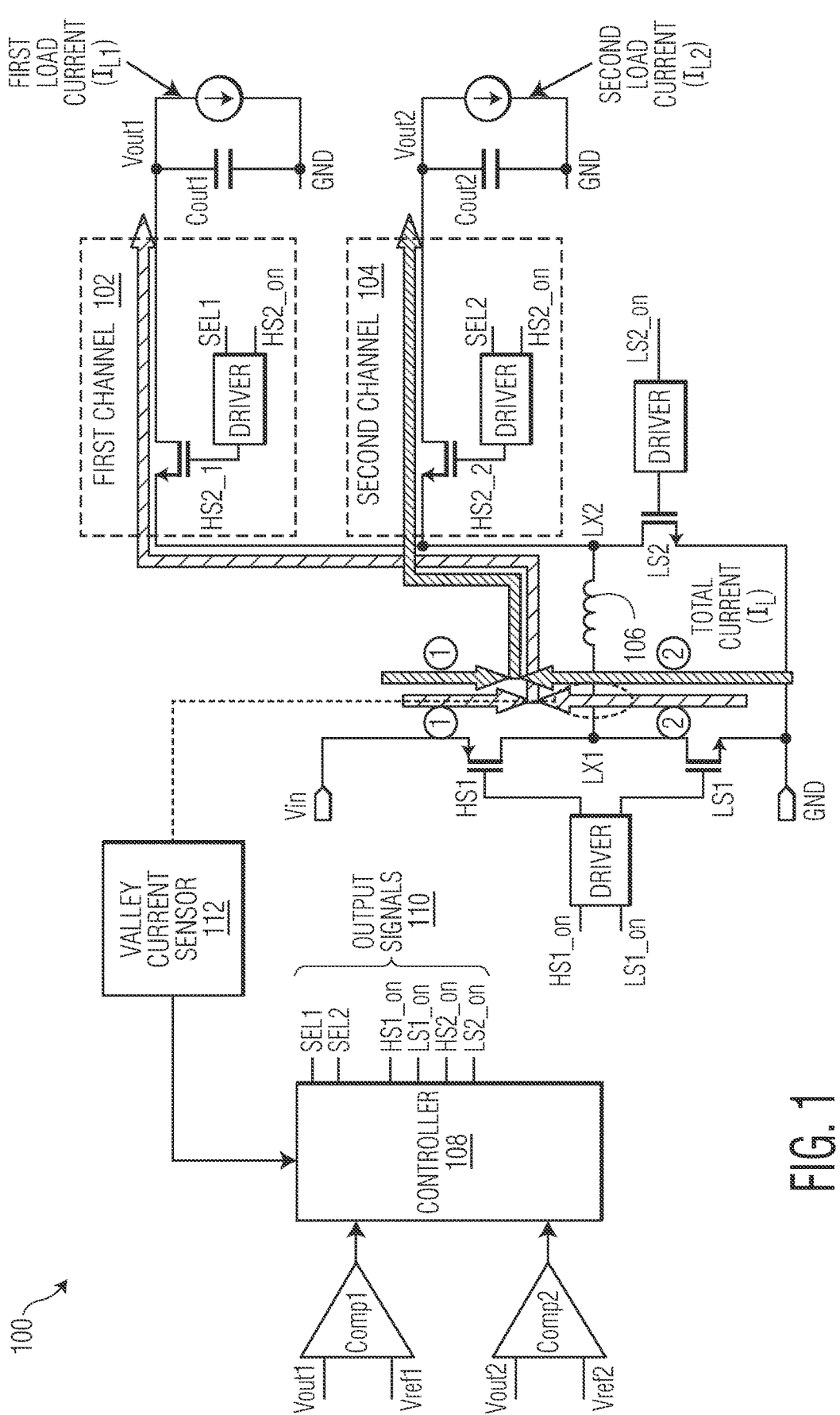
FIG. 1 represents a first example power converter.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

FIG. 1 represents a first example power converter 100 (e.g. a Single Inductor Multiple Output (SIMO) power converter). The first example power converter 100 includes a first load channel 102, a second load channel 104, an inductor 106, a power supply input (Vin), power supply switches (HS1, LS1, LS2), a controller 108 configured to generate a set of output signals 110, a valley current sensor 112, and a set of comparators (Comp1, Comp2).

The first load channel 102 includes an HS2_1 switch coupled between the inductor 106 and an output configured to present a first output voltage (Vout1) and a first load current (IL1) to a load (as shown). The HS2_1 switch is controlled with a driver configured to receive SEL1 and HS2_on output signals 110 from the controller 108. SEL1 herein defines a first on-time (Ton1) for the first channel 102, and SEL2 herein defines a second on-time (Ton2) for the second channel 104.

The second load channel 104 includes an HS2_2 switch coupled between the inductor 106 and an output configured to present a second output voltage (Vout2) and a second load current (IL2) to a load (as shown). The HS2_2 switch is controlled with a driver configured to receive SEL2 and HS2_on output signals 110 from the controller 108.

The output signals 110 from the controller 108 also control a total current (IL) supplied through the inductor 106 by controlling the power supply switches (HS1, LS1, LS2). The controller 108 monitors the total current (IL) supplied through the inductor 106 using the valley current sensor 112. In this example the power converter 100 is in buck mode configuration similar to H-bridge buck-boost converter.

The comparators (Comp1, Comp2) respectively compare the first and second channel 102, 104 output voltages Vout1 and Vout2 to reference voltages (Vref1, Vref2). The comparators output a first logic state (e.g. a first power request signal) if Vout is below Vref and a second logic state (e.g. a second power request signal) if Vout is above Vref. How often the comparator's logic state changes herein defines a first switching frequency for the first channel 102, and a second switching frequency for the second channel 104.

Figure 2:
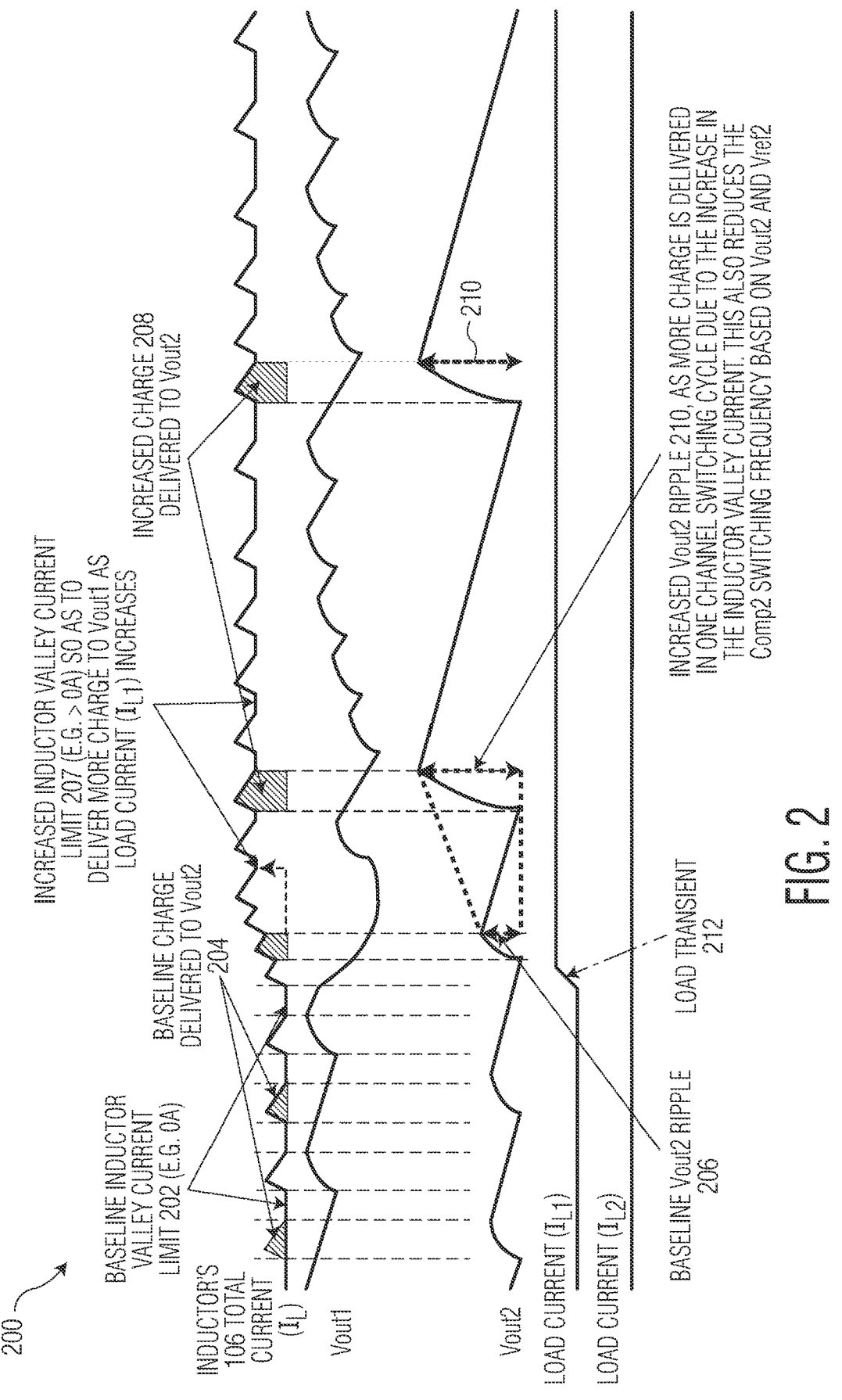
FIG. 2 represents a first example set of waveforms for the first example power converter.

FIG. 2 represents a first example set of waveforms 200 for the first example power converter 100. The first example set of waveforms 200 show the inductor's 106 total current (IL), the first channel's 102 output voltage (Vout1), the second channel's 104 output voltage (Vout2), a first load channel's 102 current draw (IL1) (e.g. high-load current draw), and a second load channel's 104 current draw (IL2) (e.g. low-load current draw).

The inductor's 106 baseline valley current limit 202, baseline charge delivered to Vout2 204, baseline Vout2 ripple 206, increased inductor's 106 valley current limit 207, increased charge 208 delivered to Vout2, and increased Vout2 ripple 210 are also shown.

During operation of the power converter 100, due to the power requirements of the first and second load, Vout1 and/or Vout2 will periodically drop below their respective reference voltages Vref1 and Vref2. In response, their respective comparators (i.e. Comp1 or Comp2) repeatedly send the power request signal to the controller 108.

The controller 108 in response controls the power supply switches (HS1, LS1, LS2) to send power (e.g. charge current) to the first and second channels 102, 104 as shown in FIG. 1. The controller 108 alternates delivery of charge current to the channels 102, 104 using the SEL1 and SEL2 output signals 110 sent to drivers that respectively control the HS2_1 and the HS2_2 switches. If there are additional power request signals from additional channels (not shown), then each channel needs to wait in turn for its respective SEL signal to be activated. Due to this "wait time", Vout for several of the channels could drop much further below their respective Vref reference voltages.

Charge current delivery to the first channel 102 switches to the second channel 104 when the total current (IL) through the inductor 106 decreases to a predetermined valley current limit (e.g. the baseline inductor's 106 valley current limit 202 which in some example could be 0A) that is detected by the valley current sensor 112 and set to the controller 108.

When there is a load transient 212 (i.e. Vout1 load current increases to a high-load), the controller 108 increases the valley current limit from the baseline inductor's 106 valley current limit 202 to the increased inductor's 106 valley current limit 207 so as to maintain Vout1 at or above Vref1 (i.e. reduce Vout1 dip at load transient for Vout1), even though the Vout2 load current (IL2) remains at a low-load.

The increased valley current limit 207 however also increases an amount of charge current sent to the second channel 104 and Cout2. This dramatically increases the baseline charge delivered to Vout2 204 to the increased charge 208 delivered to Vout2, as shown by the solid color area increase in FIG. 2, which represents a total charge delivered to the second channel 104 Cout2 capacitor.

Such an increase in charge transferred to Cout2 increases the baseline Vout2 ripple 206 to the increased Vout2 ripple 210 which can be unacceptable in some applications. Such an extra charge delivery to Vout2 also reduces the Comp2 (Vout2 comparison to Vref2) second switching frequency for the second channel 104, as shown in FIG. 2.

Thus in a SIMO type power converter, since all of the load channels 102, 104 are sharing one inductor's 106 current, if the total inductor current (IL) increases for a heavy-load channel (e.g. the first channel 102), then the ripple of other light-load channels (e.g. the second channel 104) are increased.

The first example power converter 100 in some examples may operate in a Dis-continuous Conduction Mode (DCM) control, in an attempt to avoid interference between load channels. However, a disadvantage of such DCM control is a lower total output current capability and a large Vout dips during heavy load transients. To reduce the Vout dip at load transient, additional valley current control is used (increasing valley). But this eventually increase voltage ripple of light load channel.

Now discussed are example SIMO type power converters using load-channel on-time (Ton) adjustment that maintain a low voltage ripple on their light-load channels, even when one or more of their channels are drawing a heavy-load. Advantages of adjustable ripple frequencies include lower ripple noise under varying load conditions in sensitive audible, interference, statutorily regulated, or other frequency bands.

Figure 3:
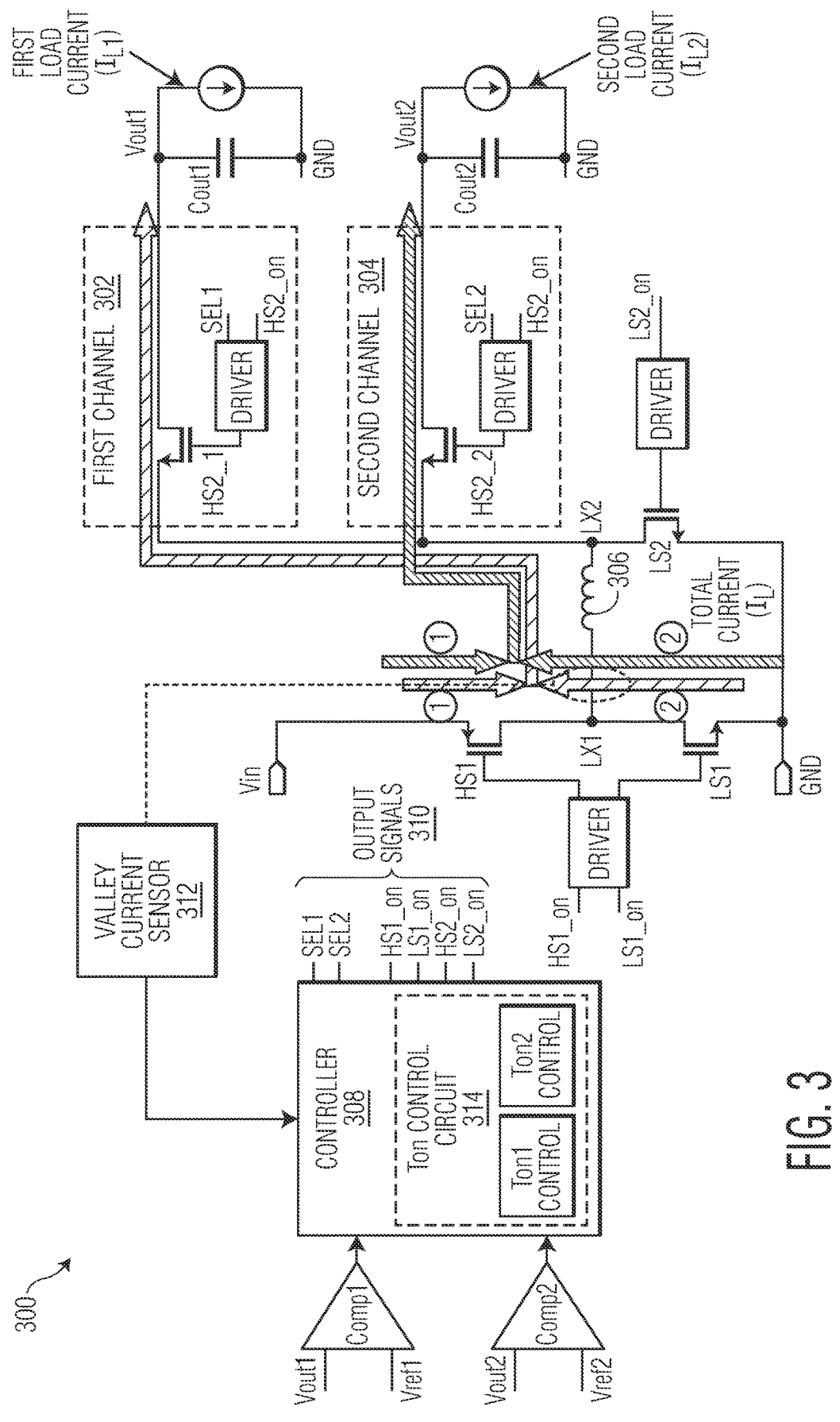
FIG. 3 represents a second example power converter.

FIG. 3 represents a second example power converter 300. The second example power converter 300 includes a first load channel 302, a second load channel 304, an inductor 306, a power supply input (Vin), power supply switches (HS1, LS1, LS2), a controller 308 configured to generate a set of output signals 310, a valley current sensor 312, and a set of comparators (Comp1, Comp2). The controller 308 includes an on-time (Ton) control circuit 314.

The first load channel 302 includes an HS2_1 switch coupled between the inductor 306 and an output configured to present a first output voltage (Vout1) and a first load current (IL1) to a load (as shown). The HS2_1 switch is controlled with a driver configured to receive SEL1 and HS2_on output signals 310 from the controller 308. SEL1 herein defines a first on-time (Ton1) for the first channel 302, and SEL2 herein defines a second on-time (Ton2) for the second channel 304.

The second load channel 304 includes an HS2_2 switch coupled between the inductor 306 and an output configured to present a second output voltage (Vout2) and a second load current (IL2) to a load (as shown). The HS2_2 switch is controlled with a driver configured to receive SEL2 and HS2_on output signals 310 from the controller 308.

The output signals 310 from the controller 308 also control a total current (IL) supplied through the inductor 306 by controlling the power supply switches (HS1, LS1, LS2). The controller 308 monitors the total current (IL) supplied through the inductor 306 using the valley current sensor 312.

The comparators (Comp1, Comp2) respectively compare the first and second channel 302, 304 output voltages Vout1 and Vout2 to reference voltages (Vref1, Vref2). The comparators output a first logic state (e.g. a first power request signal) if Vout is below Vref and a second logic state (e.g. a second power request signal) if Vout is above Vref. How often the comparator's logic state changes herein defines a first switching frequency for the first channel 302, and a second switching frequency for the second channel 304.

The controller 308 is configured to monitor (see first predetermined time period 414 and second predetermined time period 416 in FIG. 4 and further discussed below) the first and second switching frequencies calculated based on the comparators (Comp1, Comp2) logic state changes.

When the controller 308 determines that either the first and/or second switching frequencies are not within their individual or respective predetermined range(s), then the controller commands the on-time (Ton) control circuit 314 to adjust the SEL1 and SEL2 on-times to deliver less or more charge current to the first and/or second channels 302, 304 as needed so as to bring the first and/or second switching frequencies back to within their individual or respective predetermined range(s).

In some example embodiments, the on-time (Ton) control circuit 314 includes adjusts Ton for only one channel, while in other example embodiments, the on-time (Ton) control circuit 314 can independently adjust the Ton for each channel.

In some example embodiments, the controller 308 adjusts the Ton times so that the first and/or second switching frequencies are substantially the same. While in other example embodiments, the controller 308 adjusts the Ton times so that the first and/or second switching frequencies differ by a predetermined amount. In yet other example embodiments, the controller 308 adjusts the Ton times so that the first and/or second switching frequencies are both outside of an audible band (e.g. either both below, both above, or one above and one below the audible frequency band).

Figure 4:
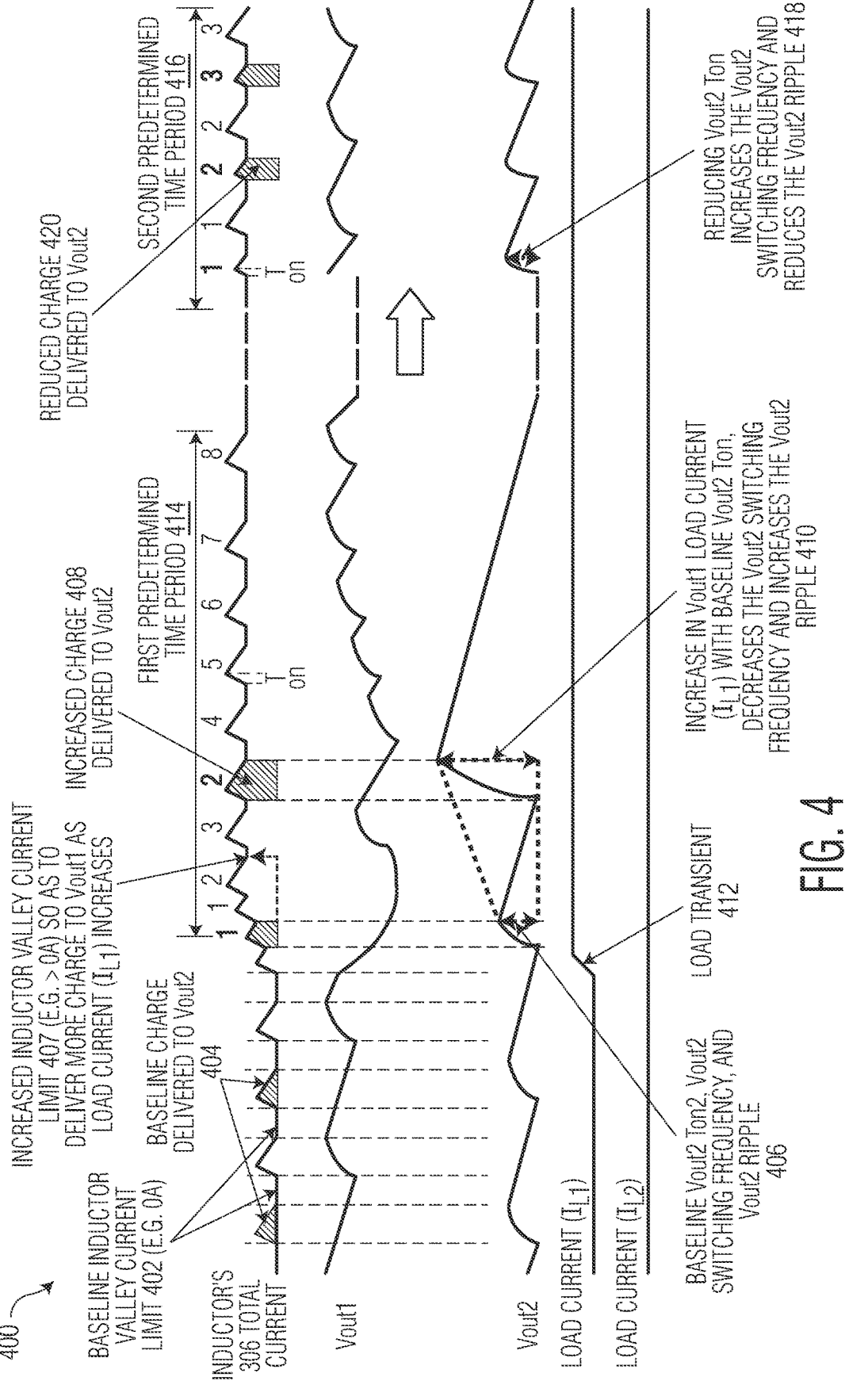
FIG. 4 represents a second example set of waveforms for the second example power converter.

FIG. 4 represents a second example set of waveforms 400 for the second example power converter 300. The second example set of waveforms 400 show the inductor's 306 total current (IL), the first channel's 302 output voltage (Vout1), the second channel's 304 output voltage (Vout2), a first load channel's 302 current draw (IL1) (e.g. high-load current draw), and a second load channel's 304 current draw (IL2) (e.g. low-load current draw).

The inductor's 306 baseline valley current limit 402, baseline charge delivered to Vout2 404, baseline Vout2 ripple 406, increased inductor's 306 valley current limit 407, increased charge 408 delivered to Vout2, increased Vout2 ripple 410, load transient 412, first predetermined time period 414, second predetermined time period 416, reduced Vout2 ripple 418, and reduced charge 420 delivered to Vout2 are also shown.

As introduced above, during operation of the power converter 300, due to the power requirements of the first and second load, Vout1 and/or Vout2 will periodically drop below their respective reference voltages Vref1 and Vref2. In response, their respective comparators (i.e. Comp1 or Comp2) repeatedly send the power request signal to the controller 308.

The controller 308 in response controls the power supply switches (HS1, LS1, LS2) to send power (e.g. charge current) to the first and second channels 302, 304 as shown in FIG. 3. The controller 308 alternates delivery of charge current to the channels 302, 304 using the SEL1 and SEL2 output signals 310 sent to drivers that respectively control the HS2_1 and the HS2_2 switches. If there are additional power request signals from additional channels (not shown), then each channel needs to wait in turn for its respective SEL signal to be activated.

Charge current delivery to the first channel 302 switches to the second channel 304 when the total current (IL) through the inductor 306 decreases to a predetermined valley current limit (e.g. the baseline inductor's 306 valley current limit 402 which in some example could be 0A) that is detected by the valley current sensor 312 and set to the controller 308.

When there is a load transient 412 (i.e. Vout1 load current increases to a high-load), the controller 308 increases the valley current limit from the baseline inductor's 306 valley current limit 402 to the increased inductor's 306 valley current limit 407 so as to maintain Vout1 at or above Vref1 (i.e. reduce Vout1 dip at load transient for Vout1), even though the Vout2 load current (IL2) remains at a low-load.

The increased valley current limit 407 however also increases an amount of charge current sent to the second channel 304 and Cout2. This dramatically increases the baseline charge delivered to Vout2 404 to the increased charge 408 delivered to Vout2, as shown by the solid color area increase in FIG. 4, which represents a total charge delivered to the second channel 304 Cout2 capacitor.

Such an increase in charge transferred to Cout2 increases the baseline Vout2 ripple 406 to the increased Vout2 ripple 410 which as discussed above can be unacceptable in some applications. Such an extra charge delivery to Vout2 also reduces the Comp2 (Vout2 comparison to Vref2) second switching frequency for the second channel 304, as shown in FIG. 4.

Example embodiments of how to reduce the increased Vout2 ripple 410 to the reduced Vout2 ripple 418 are now further discussed. In some example embodiments, as soon as the controller 308 changes the baseline inductor's 306 valley current limit 402 to the increased inductor's 306 valley current limit 407, the controller 308 defines the first predetermined time period 414 and begins monitoring the first and second switching frequencies calculated based on the comparators (Comp1, Comp2) logic state changes (e.g. FIG. 4 shows eight (8) Comp1 logic state switches and two (2) Comp2 logic state switches). In some example embodiments, the controller 308 averages one or more of the switching frequencies (e.g. for the light load channel) over the first predetermined time period 414.

In this example, the controller 308 determines that the second switching frequency of the second channel has dramatically reduced. While the Vout ripple is increased from the baseline Vout2 ripple 406 to the increased Vout2 ripple 410 which was predetermined to be out of the predetermined range for Vout2. In response the controller 308 reduces the SEL2 on-time (Ton2) for the second channel 304 which reduces the increased charge 408 delivered to Vout2 to the reduced charge 420 delivered to Vout2, as shown in FIG. 4. Since less charge current is delivered to the second channel 304, the increased Vout2 ripple 410 is brought back down to the reduced Vout2 ripple 418, as shown in FIG. 4.

To update that the first and/or second switching frequencies are or are not within their individual or respective predetermined range(s), the controller 308 defines the second predetermined time period 416 and again begins monitoring the first and second switching frequencies calculated based on the comparators (Comp1, Comp2) logic state changes (e.g. FIG. 4 now shows three (3) Comp1 logic state switches and three (3) Comp2 logic state switches), which in this example are within the predetermined range(s).

The controller 308 continues to define additional predetermined time periods as necessary and repeats the above monitoring and adjusting process. Thus by reducing the on-time (Ton) of the second (low-load) channel 306, a smaller charge is delivered to Cout2 and the Vout2 ripple is decreased.

Various instructions and/or operational steps discussed in the above Figures can be executed in any order, unless a specific order is explicitly stated. Also, those skilled in the art will recognize that while some example sets of instructions/steps have been discussed, the material in this specification can be combined in a variety of ways to yield other examples as well, and are to be understood within a context provided by this detailed description.

In some example embodiments these instructions/steps are implemented as functional and software instructions. In other embodiments, the instructions can be implemented either using logic gates, application specific chips, firmware, as well as other hardware forms.

When the instructions are embodied as a set of executable instructions in a non-transitory computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transitory machine or computer-usable media or mediums as defined herein excludes signals, but such media or mediums may be capable of receiving and processing information from signals and/or other transitory mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A power converter, comprising:
a power supply input configured to receive electrical power;
a controller;
an inductance having a first end coupled to the power supply input;
a first load channel coupled to a second end of the inductance, and having a first select switch (SEL1) coupled to the controller, and configured to present a first output voltage (Vout1) and a first charge current from the power supply input to a first load;
a second load channel coupled to the second end of the inductance, and having a second select switch (SEL2) coupled to the controller, and configured to present a second output voltage (Vout2) and a second charge current from the power supply input to a second load;
wherein the controller is configured to set a first on-time (Ton1) for the first channel using the SEL1, and to set a second on-time (Ton2) for the second channel using the SEL2;
wherein the controller is configured to calculate a first switching frequency for the first channel by counting a number of times the first output voltage (Vout1) switches between above and below a first reference voltage (Vref1); and wherein the controller is configured to adjust the first on-time (Ton1) based on the first switching frequency;

further comprising a first comparator (Comp1) coupled to receive the Vout1 and the and the Vref1;

wherein the first comparator (Comp1) is configured to compare the Vout1 to the Vref1, and output a first logic state if Vout1 is below Vref1 and a second logic state if Vout1 is above Vref1; and wherein the controller is configured to calculate the first switching frequency by counting a number of times the first comparator (Comp1) switches between the first logic state and the second logic state within a predetermined time period.

2. The power converter of claim 1:

wherein the controller is configured to adjust the first on-time (Ton1) so that the first switching frequency falls within a predefined frequency range.

3. The power converter of claim 1:

wherein the controller is configured to calculate a second switching frequency for the second channel by counting a number of times the second output voltage (Vout2) switches between above and below a second reference voltage (Vref2).

4. The power converter of claim 3:

wherein the controller is configured to adjust either the first on-time (Ton1) and/or the second on-time (Ton2) based on either the first switching frequency and/or the second switching frequency.

5. The power converter of claim 3:

wherein the controller is configured to adjust the first on-time (Ton1) so that the first switching frequency falls within a first predefined frequency range; and wherein the controller is configured to adjust the second on-time (Ton2) so that the second switching frequency falls within a second predefined frequency range.

6. The power converter of claim 5:

wherein the first predefined frequency range and the second predefined frequency range are outside of at least one of: an audible frequency range, an interference frequency range, or a statutorily regulated frequency range.

7. The power converter of claim 3:

wherein the controller is configured to adjust the first on-time (Ton1) and the second on-time (Ton2) so that the first switching frequency and the second switching frequency falls within a same predefined frequency range.

8. The power converter of claim 3:

wherein the second reference voltage (Vref2) is a single second reference voltage (Vref2).

9. The power converter of claim 1:

wherein the first switching frequency is generated by a voltage ripple on the first output voltage (Vout1); and wherein the controller is configured to adjust the first on-time (Ton1) so that the voltage ripple falls below a predefined voltage ripple.

10. The power converter of claim 1:

wherein the controller is configured to calculate a second switching frequency for the second channel by counting a number of times the second output voltage (Vout2) switches between above and below a second reference voltage (Vref2);

wherein the controller is configured to adjust the second on-time (Ton2) based on the second switching frequency;

further comprising a second comparator (Comp2) coupled to receive the second output voltage (Vout2) and the second reference voltage (Vref2);

wherein the first second comparator (Comp2) is configured to output a first logic state if Vout2 is below Vref2 and a second logic state if Vout2 is above Vref2; and wherein the controller is configured to calculate the first second switching frequency by counting a number of times the second comparator (Comp2) switches between the first logic state and the second logic state within the predetermined time period.

11. The power converter of claim 10:

wherein the first logic state is a first power request signal commanding the controller to provide more charge current to the first load channel; and wherein the second logic state is a second power request signal commanding the controller to provide less charge current to the first load channel.

12. The power converter of claim 1:

wherein the inductance is a single inductor.

13. The power converter of claim 1:

wherein the first load channel is a heavy-load channel, and the second load channel is a light-load channel.

14. The power converter of claim 1:

wherein the power converter is a DC to DC converter.

15. The power converter of claim 1:

wherein the first on-time (Ton1) does not overlap with the second on-time (Ton2).

16. The power converter of claim 1:

further comprising a valley current sensor coupled between the inductance and the controller, and configured to measure a total current (IL) in the inductance.

17. The power converter of claim 1:

wherein the first reference voltage (Vref1) is a single first reference voltage (Vref1).

18. A power converter, comprising:

a power supply input configured to receive electrical power;

a controller;

an inductance having a first end coupled to the power supply input;

a first load channel coupled to a second end of the inductance, and having a first select switch (SEL1) coupled to the controller, and configured to present a first output voltage (Vout1) and a first charge current from the power supply input to a first load;

a second load channel coupled to the second end of the inductance, and having a second select switch (SEL2) coupled to the controller, and configured to present a second output voltage (Vout2) and a second charge current from the power supply input to a second load;

wherein the controller is configured to set a first on-time (Ton1) for the first channel using the SEL1, and to set a second on-time (Ton2) for the second channel using the SEL2;

wherein the controller is configured to calculate a first switching frequency for the first channel by counting a number of times the first output voltage (Vout1) switches between above and below a first reference voltage (Vref1); and wherein the controller is configured to adjust the first on-time (Ton1) based on the first switching frequency;

further comprising a valley current sensor coupled between the inductance and the controller, and configured to measure a total current (IL) in the inductance;

wherein the controller is configured to stop sending charge current to the first load channel and start sending charge current to the second load channel when the total current (IL) through the inductance decreases to a predetermined valley current limit.

19. A power converter, comprising:

a power supply input configured to receive electrical power;

a controller;

an inductance having a first end coupled to the power supply input;

a first load channel coupled to a second end of the inductance, and having a first select switch (SEL1) coupled to the controller, and configured to present a first output voltage (Vout1) and a first charge current from the power supply input to a first load;

a second load channel coupled to the second end of the inductance, and having a second select switch (SEL2) coupled to the controller, and configured to present a second output voltage (Vout2) and a second charge current from the power supply input to a second load;

wherein the controller is configured to set a first on-time (Ton1) for the first channel using the SEL1, and to set a second on-time (Ton2) for the second channel using the SEL2;

wherein the controller is configured to calculate a first switching frequency for the first channel by counting a number of times the first output voltage (Vout1) switches between above and below a first reference voltage (Vref1); and wherein the controller is configured to adjust the first on-time (Ton1) based on the first switching frequency;

further comprising a valley current sensor coupled between the inductance and the controller, and configured to measure a total current (IL) in the inductance;

wherein in response to a load transient, the controller is configured to change the predetermined valley current limit from a first limit to a second limit; and wherein the controller is configured to begin counting the number of times the first output voltage (Vout1) switches between above and below a first reference voltage (Vref1) when the controller changes the first limit to the second limit, and ending after a predetermined time period.

20. The power converter of claim 19:

wherein the controller is configured to average the first switching frequency over the predetermined time period.

* * * * *